United States Patent
Resch (10) Patent No.: US 10,920,759 B2
(45) Date of Patent: Feb. 16, 2021

(54) REFRIGERANT COMPRESSOR

(71) Applicant: Secop GmbH, Flensburg (DE)

(72) Inventor: Reinhard Resch, Feldbach (AT)

(73) Assignee: Secop GmbH, Flensburg (DE)

( * ) Notice: Subject to any disclaimer, the term of this patent is extended or adjusted under 35 U.S.C. 154(b) by 369 days.

(21) Appl. No.: 15/575,931

(22) PCT Filed: Feb. 29, 2016

(86) PCT No.: PCT/EP2016/054235
§ 371 (c)(1),
(2) Date: Nov. 21, 2017

(87) PCT Pub. No.: WO2016/188644
PCT Pub. Date: Dec. 1, 2016

(65) Prior Publication Data
US 2018/0149148 A1 May 31, 2018

(30) Foreign Application Priority Data

May 22, 2015 (AT) .............................. GM50095/2015

(51) Int. Cl.
*F04B 39/00* (2006.01)
*B32B 25/00* (2006.01)
(Continued)

(52) U.S. Cl.
CPC .......... *F04B 39/0044* (2013.01); *B32B 25/00* (2013.01); *F04B 39/023* (2013.01);
(Continued)

(58) Field of Classification Search
CPC .......... F04B 17/00; F04B 17/03; F04B 35/00; F04B 35/04; F04B 39/00; F04B 39/0044;
(Continued)

(56) References Cited

U.S. PATENT DOCUMENTS 2,977,043 A   3/1961  Scheldorf
3,030,056 A   4/1962  Rogers
(Continued)

FOREIGN PATENT DOCUMENTS

CN   1779243 A      5/2006
CN   104696195 A *  6/2015
(Continued)

OTHER PUBLICATIONS

International Search Report of PCT/EP2016/054235, dated Jun. 2, 2016.
(Continued)

*Primary Examiner* — Kenneth J Hansen
*Assistant Examiner* — Chirag Jariwala
(74) *Attorney, Agent, or Firm* — Collard & Roe, P C.

(57) ABSTRACT

A refrigerant compressor includes a hermetically sealed housing and includes a drive unit; wherein the drive unit is arranged in the interior of the housing and is attached, by way of at least one spring element, to at least one mounting region of the housing with mounting action; wherein a first mounting element and a second mounting element are provided; wherein one of the two mounting elements is connected to the drive unit and the other of the two mounting elements is connected to the mounting region. The first mounting element is of sleeve-like form and has an inner wall, and the second mounting element has a bolt-like section, wherein the bolt-like section is received at least in sections in the first mounting element, whereby an overlap region is formed, in which overlap region a gap is formed between the bolt-like section of the second mounting element and the inner wall of the first mounting element.

18 Claims, 4 Drawing Sheets

(51) Int. Cl.
*F04B 39/12* (2006.01)
*F16F 15/08* (2006.01)
*F04B 39/02* (2006.01)
*F16F 1/12* (2006.01)

(52) U.S. Cl.
CPC ............ *F04B 39/127* (2013.01); *F16F 1/125* (2013.01); *F16F 15/085* (2013.01); *F05C 2225/00* (2013.01)

(58) Field of Classification Search
CPC .. F04B 39/0027; F04B 39/023; F04B 39/127; F16F 1/125; F16F 15/02; F16F 15/022; F16F 15/04; F16F 15/046; F16F 15/08; F16F 15/085
USPC .................. 417/360, 415; 248/565, 606, 612
See application file for complete search history.

(56) References Cited

U.S. PATENT DOCUMENTS

| | | | | |
|---|---|---|---|---|
| 3,531,069 | A | | 9/1970 | Dubberley |
| 4,416,594 | A | * | 11/1983 | Ichikawa ............... F04B 39/127 |
| | | | | 248/606 |
| 5,456,719 | A | * | 10/1995 | Keller ................. A61F 2/30721 |
| | | | | 623/11.11 |
| 2006/0024175 | A1 | * | 2/2006 | Yagi ...................... F04B 39/127 |
| | | | | 417/363 |
| 2008/0159887 | A1 | * | 7/2008 | Schogler ............. F04B 39/0044 |
| | | | | 417/415 |
| 2016/0195079 | A1 | * | 7/2016 | Miguel ............... F04B 39/0027 |
| | | | | 92/161 |

FOREIGN PATENT DOCUMENTS

| | | | |
|---|---|---|---|
| DE | 38 02 922 A1 | 9/1988 | |
| GB | 2 242 723 A | 10/1991 | |
| GB | 2242723 A | * 10/1991 | ............. F16F 13/02 |
| JP | H04318293 A | 11/1992 | |

OTHER PUBLICATIONS

Austrian Search Report in GM 50095/2015 dated Oct. 15, 2015 with English translation of relevant parts.
Notification to Grant Patent Right for Invention in Chinese Application No. 201680039700.9.

* cited by examiner

REFRIGERANT COMPRESSOR

CROSS REFERENCE TO RELATED APPLICATIONS

This application is the National Stage of PCT/EP2016/054235 filed on Feb. 29, 2016, which claims priority under 35 U.S.C. § 119 of Austrian Application No. GM 50095/2015 filed on May 22, 2015, the disclosure of which is incorporated by reference. The international application under PCT article 21(2) was not published in English.

FIELD OF THE INVENTION

The present invention relates to a refrigerant compressor, comprising a hermetically sealed housing and a drive unit having a piston/cylinder unit for cyclical compression of a refrigerant and an electric motor for drive of the piston/cylinder unit; wherein the drive unit is disposed in the interior of the housing and is attached to at least one mounting region of the housing, preferably at the housing bottom, with mounting action, by means of at least one spring element; wherein a first mounting element and a second mounting element are provided; wherein one of the two mounting elements is connected with the drive unit and the other one of the two mounting elements is connected with the mounting region; wherein the first mounting element and/or the second mounting element is/are surrounded by at least one spring element; wherein the first mounting element is configured in sleeve shape and has an inner wall, and wherein the second mounting element has a bolt-shaped section, wherein the bolt-shaped section is accommodated, at least in certain sections, in the first mounting element, thereby forming an overlap region, in which overlap region a gap is formed between the bolt-shaped section of the second mounting element and the inner wall of the first mounting element.

STATE OF THE ART

In the case of refrigerant compressors that have a drive unit disposed on a hermetically sealed housing, which unit has a piston/cylinder unit and an electric motor provided for drive of the piston/cylinder unit, the drive unit is usually attached to the housing, with mounting action, by way of springs. The intent and purpose of this mounting is damping of displacements or oscillations of the drive unit, in order to prevent or damp vibrations of the drive unit and the disruptive noises that accompany them. Particularly strong displacements of the drive unit particularly come about during start-up and shut-off procedures. In order to restrict the displacements during these start-up and shut-off procedures, pressure springs are used for mounting; these are pressed onto conical spring bolts, according to the state of the art. As a result, a progressive spring characteristic line is achieved at great displacements of the spring in the transverse direction, by means of laying the spring windings against the spring bolts.

However, this solution is only suitable for pressure springs subject to relatively low transverse stress, because in the case of very great transverse forces or displacements, as they particularly occur in the case of compressors that are regulated in terms of their speed of rotation and have an outer rotor motor, individual spring windings can jump over the spring bolt. As a result, collapse of the force in the spring characteristic line comes about, on the one hand, and this leads to greater displacements. On the other hand, high-frequency vibrations ("spring cracking") occur due to the sudden stress relief when the spring windings jump over, and this has a negative acoustic effect. In addition, great stress amplitudes occur with multiple load changes, and these reduce the long-term strength of the spring. For this reason, such stressed pressure springs must be designed with a safety factor of greater than 10 with reference to the static stress caused by the weight force of the drive unit, but this has a negative effect on damping of vibrations and thereby damping of undesirable sound development.

It is known from GB 2242723 A to use bearing elements for attaching a drive unit to mounting regions in the interior of a housing, which elements comprise helical springs, wherein a cylindrical, vibration-absorbing element composed of a viscoelastic material is disposed within the helical springs and lying against them, in each instance, and/or wherein the helical springs are surrounded, in each instance, by a vibration-absorbing element composed of a viscoelastic material, which lies against them.

TASK OF THE INVENTION

It is therefore the task of the present invention to make a refrigerant compressor available that avoids the disadvantages mentioned above. In particular, particularly efficient noise damping is supposed to be achieved by means of mounting of a drive unit of the refrigerant compressor, according to the invention.

PRESENTATION OF THE INVENTION

The underlying idea of the present invention is to relieve stress on the pressure springs and/or tension springs themselves by means of a suitable design embodiment of mounting elements, so that a significantly more advantageous acoustic design is possible. This is achieved, according to the invention, by means of a mounting element that has a bolt-shaped section, which bolt-shaped section is accommodated in a sleeve-shaped section of another mounting element, at least in certain sections. Since one of the two mounting elements is connected with the drive unit and the other one of the two mounting elements is connected with a mounting region of the housing of the refrigerant compressor, displacement of the drive unit is restricted in all transverse directions—and not just in one transverse direction or a few transverse directions—and the spring itself is relieved of stress. In this regard, every transverse direction stands transverse to, preferably normal to the axial direction, which direction results from the longitudinal expanse of the bolt-shaped section.

The pressure spring or tension spring therefore no longer has to be over-dimensioned by up to a factor of 10 or more with regard to the static stress. In the case of the embodiment according to the invention, the maximal stress on the spring is determined solely by the play of the bolt-shaped section of the one mounting element within the sleeve-shaped section of the other mounting element and by the transverse stiffness of the spring. Furthermore, it should be emphasized that in this regard, the only important thing is the relative movement between the two mounting elements. The lower the transverse stiffness of the spring, the lower the maximal possible stress. Furthermore, the influences of production tolerances are slight, due to the restriction of the displacement in the vicinity of the spring, according to the invention.

Analogously, it is provided, according to the invention, in the case of a refrigerant compressor, comprising a hermetically sealed housing and a drive unit having a piston/ cylinder unit for cyclical compression of a refrigerant and an electric motor for drive of the piston/cylinder unit; wherein the drive unit is disposed in the interior of the housing and is attached to at least one mounting region of the housing, preferably at the housing bottom, with mounting action, by means of at least one spring element; wherein a first mounting element and a second mounting element are provided; wherein one of the two mounting elements is connected with the drive unit and the other one of the two mounting elements is connected with the mounting region; wherein the first mounting element and/or the second mounting element is/are surrounded by at least one spring element that the first mounting element is configured in sleeve shape and has an inner wall, and that the second mounting element has a bolt-shaped section, wherein the bolt-shaped section is accommodated, at least in certain sections, in the first mounting element, thereby forming an overlap region, in which overlap region a gap is formed between the bolt-shaped section of the second mounting element and the inner wall of the first mounting element.

In this way, improved utilization of space is furthermore also achieved, allowing a reduction in size of the housing volume—typically by about 0.15 L—in comparison with refrigerant compressors known from the state of the art. Furthermore, the solution according to the invention does not have any disadvantages of any kind with regard to the long-term strength of the mounting of the drive unit and of the refrigerant compressor as a whole.

In particular, the first mounting element can be connected with the drive unit, and the second mounting element can be connected with the mounting region.

Dimensioning of the gap is important in order to permit a certain displacement of the drive unit for vibration damping and, at the same time, to achieve the desired displacement restriction along with mechanical stability of the mounting. In this regard, a radial gap width can be set in relation to the diameter of the inner wall, particularly if the inner wall is disposed directly after the bolt-shaped section, viewed in the radial direction. However, embodiment variants where the spring element is disposed between the inner wall and the bolt-shaped section are also conceivable. In this case, the gap must have a sufficiently great radial gap width in order to also permit a transverse movement in addition to accommodating the spring element. According to the results of extensive experimental series, it is provided, in a preferred embodiment of the refrigerant compressor according to the invention, that the gap takes up between 20% and 60%, preferably between 30% and 50%, particularly between 35% and 45% of the diameter of the inner wall.

In order to allow particularly simple and space-saving fixation of the spring element, it is provided, in the case of a preferred embodiment of the refrigerant compressor according to the invention, that the first mounting element is connected with the spring element with force fit, at least in certain sections.

In order to achieve a particularly stable connection of the spring element with the first mounting element, on the one hand, and, on the other hand, to simplify assembly of the mounting or of the refrigerant compressor, it is provided, in the case of a preferred embodiment of the refrigerant compressor according to the invention, that a first end section of the spring element is braced between the first mounting element and a clamping sleeve disposed on the first mounting element.

In order to obtain a second mounting element that is particularly mechanically stable, it is provided, in the case of a preferred exemplary embodiment of the refrigerant compressor according to the invention, that the bolt-shaped section is formed by a first end section of the second mounting element, wherein a second end section of the second mounting element has a greater diameter in comparison with the bolt-shaped section. Preferably, the bolt-shaped section and the first end section of the second mounting element are configured in one piece. Particularly preferably, the entire second mounting element is configured in one piece.

In the case of displacements of the drive device, contact of parts of the second mounting element with the first mounting element can occur, which parts do not lie on the bolt-shaped section. In order to exclude that the two mounting elements hook into one another in this case, and in order to allow the two mounting elements to slide on one another, it is provided, in the case of a preferred embodiment of the refrigerant compressor according to the invention, that the second mounting element has a transition section that is disposed between the bolt-shaped section and the second end section, in which transition section the diameter increases uniformly, preferably conically, from a smallest value in the region of the bolt-shaped section to a greatest value in the region of the second end section of the second mounting element.

The greater diameter of the second end section of the second mounting element, in comparison with the bolt-shaped section, offers a simple possibility for fixing the spring element in place on the second mounting element, preferably in that the spring element is drawn over the second end section and presses against the second end section on the basis of its own elasticity or inherent tension. For this reason, it is provided, in the case of a preferred embodiment of the refrigerant compressor according to the invention, that the second end section of the second mounting element is connected with the spring element with force fit.

In order to also restrict displacements of the drive unit in the axial direction, preferably in the pressure direction of the spring element, it is provided, in the case of a preferred embodiment of the refrigerant compressor according to the invention, that the first end section of the second mounting element is delimited in the axial direction by a first stop surface, preferably a planar stop surface, for contact with a second stop surface.

In order to be able to implement the second stop surface in particularly simple manner, in terms of design, it is provided, in the case of a preferred embodiment of the refrigerant compressor according to the invention, that the second stop surface is formed by the first mounting element or by the drive unit, wherein the first stop surface and the second stop surface are spaced apart from one another in an operating position.

In order to create a possibility for being able to restrict the displacement of the drive unit completely, i.e. both in the pressure direction and also in the tension direction of a single spring, in the axial direction, in simple manner, in terms of design, it is provided, in the case of a preferred embodiment of the refrigerant compressor according to the invention, that a first spring element is braced between a second end section of the second mounting element and the first mounting element, that a second spring element is braced between a first end section of the second mounting element and the first mounting element, and that the bolt-shaped section is formed in a section that lies between the first end section and the second end section.

Preferably, the first mounting element can thereby be disposed between the first and the second end section of the second mounting element, wherein the first mounting element can make contact with the second mounting element in the case of a displacement in the axial direction, both in the one direction and in the other, and vice versa.

In order to implement a particularly mechanically stable embodiment with regard to restricting the displacement in the transverse direction, it is provided, in the case of a particularly preferred embodiment of the refrigerant compressor according to the invention, that the bolt-shaped section passes completely through the first mounting element in the axial direction.

In order to allow particularly stable attachment of the first mounting element to the drive unit, in simple manner, in terms of design, it is provided, in the case of a particularly preferred embodiment of the refrigerant compressor according to the invention, that the first mounting element has a projecting support element, which support element is connected with the drive unit.

In the case of a preferred embodiment of the refrigerant compressor according to the invention, it is provided that the inner wall of the first mounting element and/or the bolt-shaped section are provided with a viscoelastic layer, at least in certain sections. In this way, the noise level can be further reduced in all the embodiments. In particular, in this way direct contacting of the bolt-shaped section with another element can be prevented. If, for example, the mounting elements are produced from metal, for example, disruptive metallic contact noises are reduced or prevented in this manner.

Furthermore, the noise development can be reduced once again, particularly during start-up and shut-off procedures, and at the same time, the amount of the viscoelastic material used can be kept relatively low.

In a preferred embodiment of the refrigerant compressor according to the invention, it is provided that the first mounting element is produced from a viscoelastic or flexible material. In this way, it is ensured that the relatively slight transverse stiffness of the spring element is not negatively influenced by the first mounting element.

BRIEF DESCRIPTION OF THE FIGURES

The invention will now be explained in greater detail using exemplary embodiments. The drawings are examples and are intended to present the idea of the invention, but not to narrow it in any way or to reproduce it conclusively.

The figures show.

WAYS TO IMPLEMENT THE INVENTION

Figure 1:
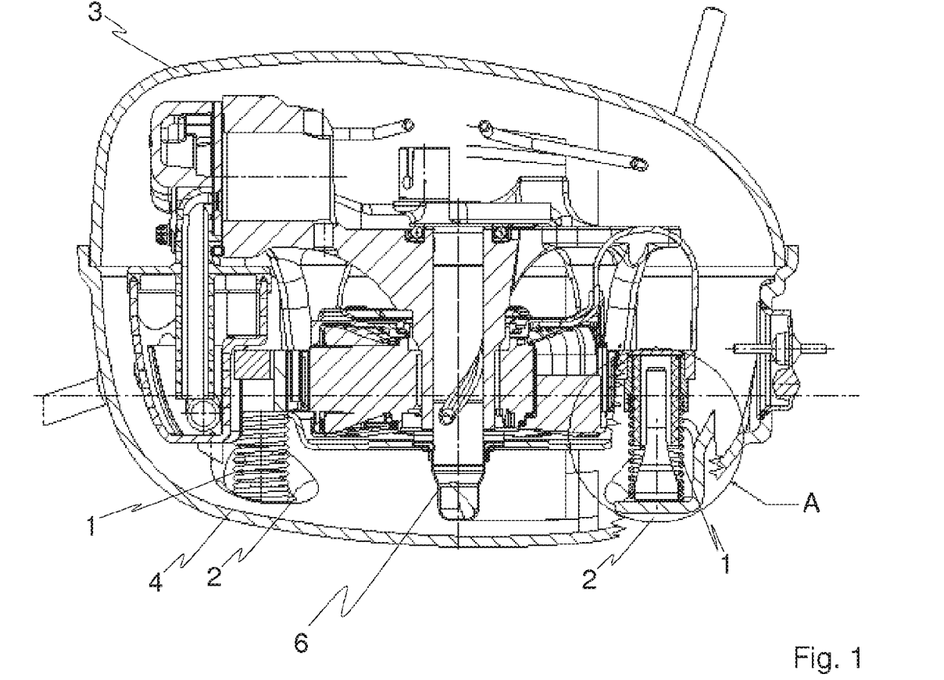
FIG. 1 a section through a refrigerant compressor according to the invention, FIG. 2 an enlarged representation of Detail A from FIG. 1, FIG. 3 a schematic representation of a further embodiment of the refrigerant compressor according to the invention, analogous to FIG. 2, FIG. 4 a schematic representation of a further embodiment of the refrigerant compressor according to the invention, analogous to FIG. 2, FIG. 5 a schematic representation of a further embodiment of the refrigerant compressor according to the invention, analogous to FIG. 2, FIG. 6 a schematic representation of a further embodiment of the refrigerant compressor according to the invention, analogous to FIG. 2, FIG. 7 a schematic representation of a further embodiment of the refrigerant compressor according to the invention, analogous to FIG. 2.

An embodiment of a refrigerant compressor according to the invention is shown in a sectional view in FIG. 1. The refrigerant compressor comprises a drive unit 6 having a piston/cylinder unit for cyclical compression of a refrigerant, and an electric motor for drive of the piston/cylinder unit. The drive unit 6 is disposed in a hermetically sealed housing 3. The housing 3 has a housing bottom 4 having mounting regions 2. The drive unit 6 is attached to the mounting regions 2 by means of spring elements 1, with mounting action, in order to damp vibrations or displacements of the drive unit 6 that occur during operation—and here, particularly strongly during start-up and shut-off or shut-down procedures of the drive unit 6—and cause disruptive noises.

According to the invention, spring elements 1 having a relatively low transverse stiffness can be used, and this allows a significantly more advantageous acoustic design in comparison with the state of the art, in which very stiff spring elements must be used. This means that disruptive noises can be reduced. This is achieved in that the possible displacement of the drive unit 6 in the entire transverse direction is restricted by the mounting or attachment, according to the invention, of the drive unit 6 to the mounting regions 2.

Figure 2:
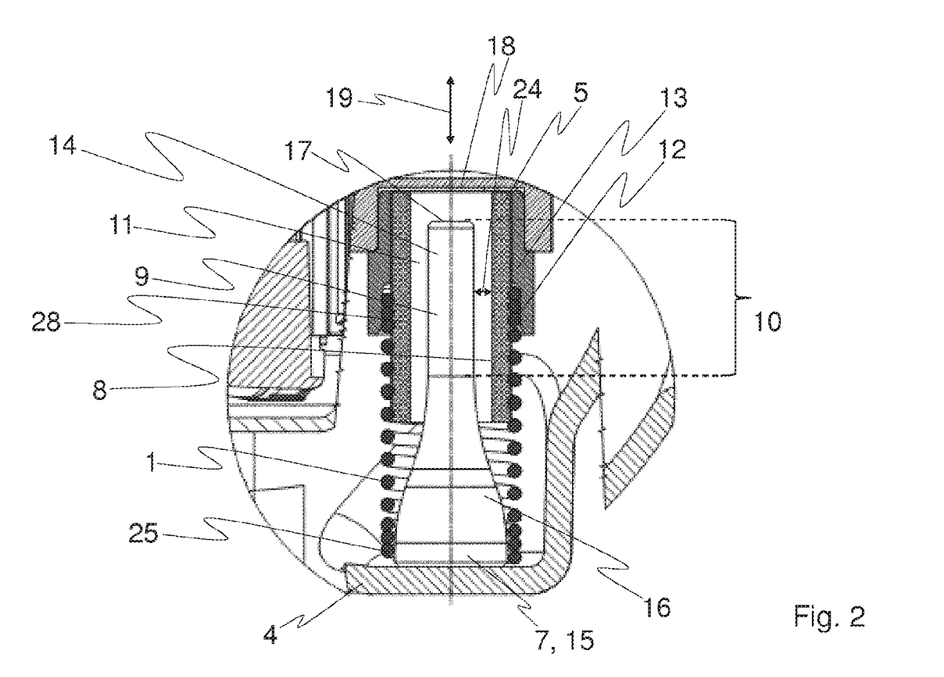

FIG. 2 shows an enlarged view of Detail A from FIG. 1 in this regard. According to the invention, a first mounting element 5 is provided, along with a second mounting element 7. The first mounting element 5 is connected with the drive unit 6 in the embodiment shown, and the second mounting element 7 is connected with the mounting region 2 or the housing bottom 4. The first mounting element 5 is sleeve-shaped, configured with an inner wall 8, and essentially has the shape of a hollow cylinder, wherein the inner wall 8 corresponds to the inner mantle surface of the hollow cylinder. The second mounting element 7 has a bolt-shaped section 9, which is disposed or accommodated in the first mounting element 5, at least in certain sections. In this way, an overlap region 10 is formed, in which the bolt-shaped section 9 overlaps with the first mounting element 5 or with the inner wall 8 of the first mounting element 5 in the axial direction 19. In the exemplary embodiment of FIG. 2, the bolt-shaped section 9 is formed by a first end section 14 of the second mounting element 7.

In order to permit displacements, up to a certain degree, in the transverse direction, i.e. in all the directions that are transverse, preferably normal to the axial direction 19, the diameter of the bolt-shaped section 9 is clearly smaller than the diameter of the inner wall 8. This has the result that a radial gap 11 is formed between the bolt-shaped section 9 and the inner wall 8, which gap establishes the maximally possible displacement in the transverse direction.

Greater displacement in the transverse direction is preferably prevented by means of contacting of the inner wall 8 by the bolt-shaped section 9. Preferably, a radial width 24 of the gap 11 amounts to between 20% and 60%, preferably between 30% and 50%, particularly between 35% and 45% of the diameter of the inner wall 8. Preferably, however, the radial width 24 of the gap 11 amounts to at least 2 mm. This means that a distance between the bolt-shaped section 9 and the inner wall 8 preferably amounts to at least 2 mm.

The mounting elements 5, 7 are typically produced from metal. When the bolt-shaped section 9 makes contact with the inner wall 8 in the case of maximal displacement in the transverse direction, this can lead to increased disruptive metallic noise development. In order to reduce this disruptive noise development during contact of the bolt-shaped section 9 on the inner wall 8, the inner wall 8 and/or the bolt-shaped section 9 is/are preferably provided with a layer (not shown) of a viscoelastic material. Particularly preferably, the first mounting element 5 is produced entirely from the viscoelastic material or a flexible material. In this way, it is ensured that the relatively slight transverse stiffness of the spring element 1 is not negatively influenced by the first mounting element 5.

In order to achieve resilient attachment or mounting of the drive unit 6 on the mounting region 2, the spring element 1 is fixed in place both on the first mounting element 5 and on the second mounting element 7 in the embodiment shown in FIG. 2. For this purpose, a force-fit connection of the spring element 1 with the first mounting element 5 is produced, in that the spring element 1 is pushed over an attachment section 28 of the first mounting element 5. Aside from force fit, which exists due to the inherent tension of the spring element 1 that is pushed on and thereby slightly widened radially, a first end section 12 of the spring element 1 is braced between the first mounting element 5 and a clamping sleeve 13 disposed on the first mounting element 5. In the region of the first end section 12 of the spring element 1, the clamping sleeve 13 surrounds the spring element 1 and the first mounting element 5.

Furthermore, a force-fit connection also exists between the spring element 1 and the second mounting element 7, which connection is exclusively produced, in the exemplary embodiment shown in FIG. 2, by means of the inherent tension of the spring element 1. For this purpose, the spring element 1 is pushed over a second end section 15 of the second mounting element 7 with a second end section 25, and braced by the inherent tension of the spring element 1. In this case, too, the tension of the spring element 1 results from a certain elastic expansion of the spring element 1—here by means of the second end section 15, which has a significantly greater diameter in comparison with the bolt-shaped section 9.

The second end section 15 is connected with the mounting region 2 in known manner. A transition section 16 of the second mounting element 7, in which the diameter of the second mounting element 7 widens from the diameter of the bolt-shaped section 9 to the diameter of the second end section 15, is disposed between the bolt-shaped section 9 and the second end section 15. In the exemplary embodiment of FIG. 2, this widening occurs continuously and uniformly. The resulting smooth transition between the bolt-shaped section 9 and the second end section 15 prevents hooking and allows sliding of the two mounting elements 5, 7 relative to one another, in the event that contact of the two mounting elements 5, 7 occurs in the region of the transition section 16 in the event of great displacements.

In order to restrict displacement in the axial direction 19, as well, a planar first stop surface 17 is provided on the first end section 14, which surface closes off the first end section 14 in the axial direction 19, facing away from the mounting region 2 or the housing bottom 4. A second stop surface 18, which faces the housing bottom 4 and serves for contacting the first stop surface 17, is disposed lying opposite the first stop surface 17. Accordingly, displacement is restricted in the axial direction 19 when the drive unit 6 moves in the direction of the housing bottom 4 and the spring element 1 is stressed with pressure. In the exemplary embodiment of FIG. 2, the second stop surface 18 is part of the drive unit 6.

Figure 3:
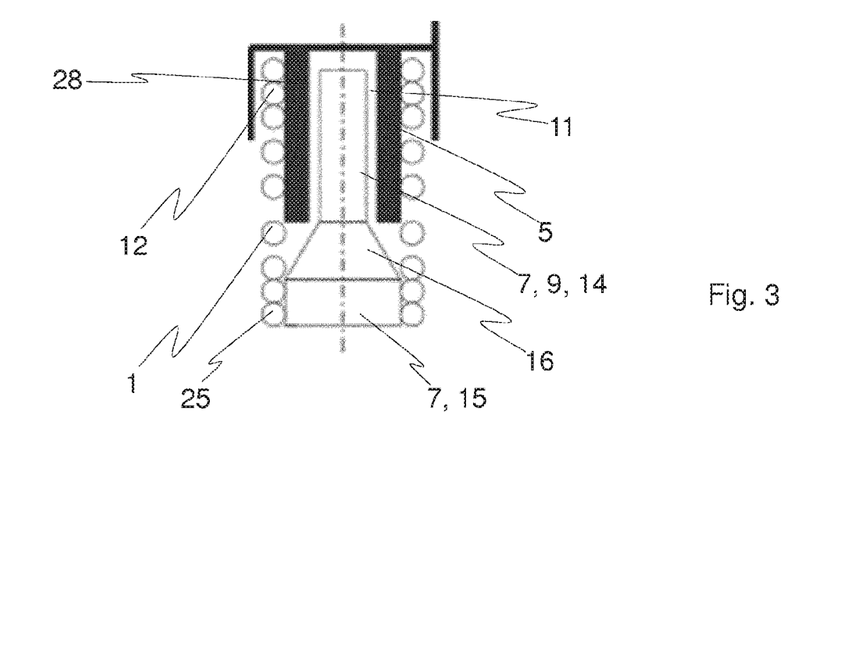

The embodiment illustrated schematically in FIG. 3 differs from the embodiment of FIG. 2 above all in that the transition between the bolt-shaped section 9 and the transition section 16, on the one hand, and between the transition section 16 and the second end section 15, on the other hand, is not structured to be smooth, but rather with bends, and this permits simpler production of the second mounting element 7.

In the embodiment of FIG. 3, as well, the spring element 1 is connected with the two mounting elements 5, 7 with force fit. However, use of a clamping sleeve is eliminated. Instead, the inherent tension of the spring element 1 is utilized, which element is pushed over the attachment section 28 of the first mounting element 5 with its first end section 12, and over the second end section 15 of the second mounting element 7 with its second end section 25.

Figure 4:
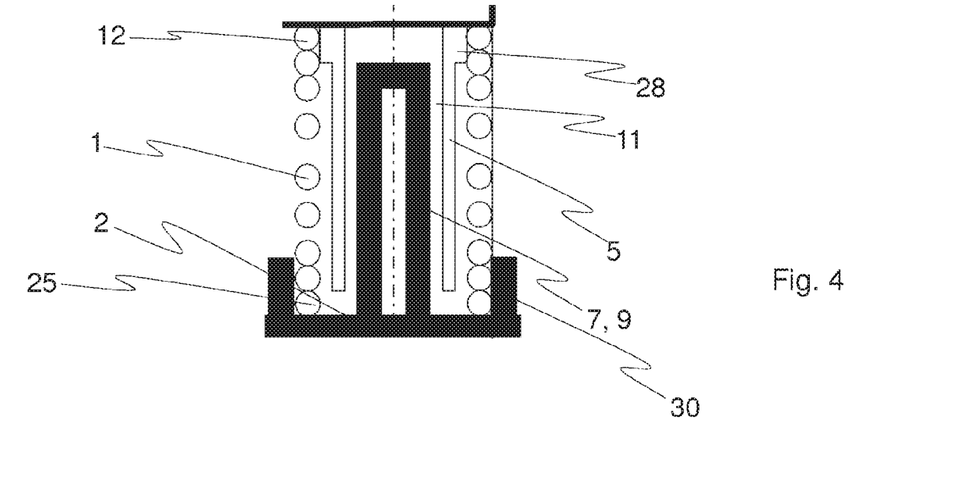

In the embodiment of FIG. 4, once again, a transition section 16 is entirely eliminated. Instead, essentially the entire second mounting element 7 is structured in bolt shape or as a bolt-shaped section 9. In this case, the spring element 1 is attached only to the first mounting element 5, with force fit, making use of the inherent tension of the spring element 1. For this purpose, the spring element 1 is pushed over the attachment section 28 of the first mounting element 5 with its first end section 12. The second end section 25 of the spring element 1, in contrast, is connected with the mounting region 2 in known manner, for example by means of a sleeve 30 welded to the mounting region 2, into which sleeve the spring element 1 is pressed, as shown in FIG. 4. In total, there is therefore once again resilient connection or mounting of the drive unit 6 with the mounting region 2.

Figure 5:
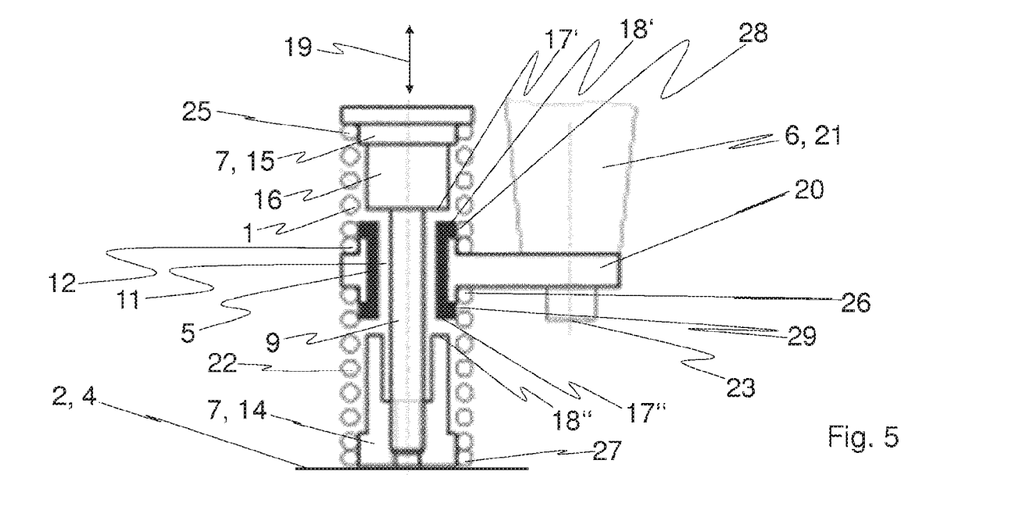

In the embodiment of FIG. 5, the bolt-shaped section 9 is formed between the first end section 14 and the second end section 15 of the second mounting element 7. The two end sections 14, 15 have a greater diameter than the bolt-shaped section 9. This allows a force-fit connection of a further spring element 22 to the second mounting element 7.

In concrete terms, the spring element 1 is braced between the second end section 15 and the first mounting element 5. In this regard, the spring element 1 is pushed over the attachment section 28 of the first mounting element 5 with its first end section 12, wherein due to the inherent tension of the spring element 1, a force fit is implemented between the first mounting element 5 and the spring element 1. The spring element 1 is pushed over the second end section 15 of the second mounting element 7 with its second end section 25, wherein due to the inherent tension of the spring element 1, a force fit is implemented between the second end section 15 and the spring element 1.

Analogously, the further spring element 22 is pushed over a further attachment section 29 of the first mounting element 5 with a first end section 26, wherein due to the inherent tension of the spring element 1, a force fit is implemented between the first mounting element 5 and the further spring element 22. The further spring element 22 is pushed over the first end section 14 of the second mounting element 7 with a second end section 27, wherein due to the inherent tension of the further spring element 22, a force fit is implemented between the first end section 14 and the further spring element 22.

The further attachment section 29 is disposed on the first mounting element 5, lying opposite the attachment section 28. Attachment of the first mounting element 5 to the drive unit 6 takes place by means of a projecting support element 20 of the first mounting element 5. In this regard, the support element 20 is attached to a crankcase 21 of the drive unit 6, and is preferably screwed to the crankcase 21 by means of a screw 23.

The second mounting element 7 is fixed in place on the mounting region 2 with its first end section 14, in known manner.

In total, an arrangement is thereby obtained, in which the bolt-shaped section 9 passes completely through the first mounting element 5. In other words, the overlap region 10 extends over the entire first mounting element 5 in the axial direction 19, and this guarantees particularly great mechanical stability with regard to displacements in the transverse direction. This arrangement furthermore permits restricting displacement in the axial direction 19—not only when the drive unit 6 moves toward the housing bottom 4 but also when the drive unit 6 moves away from the housing bottom. In order to restrict the displacement of the drive unit 6 in the axial direction 19 and toward the housing body 4, first stop surfaces 17' are provided on the second mounting element 7, and second stop surfaces 18' are provided on the first mounting element 5, which surfaces contact one another at a maximally permissible displacement and prevent greater displacements. In the case of this movement of the drive unit 6, the spring element 1 is put under tension stress and the further spring element 22 is put under pressure stress.

Analogously, first stop surfaces 17" are provided on the second mounting element 7, and second stop surfaces 18" are provided on the first mounting element 5, which surfaces contact one another in the case of a maximally permissible displacement and prevent further displacements in order to restrict the displacement of the drive unit 6 in the axial direction 19 and away from the housing bottom 4. In the case of this movement of the drive unit 6, the spring element 1 is put under pressure stress, and the further spring element 22 is put under tensile stress.

Figure 6:
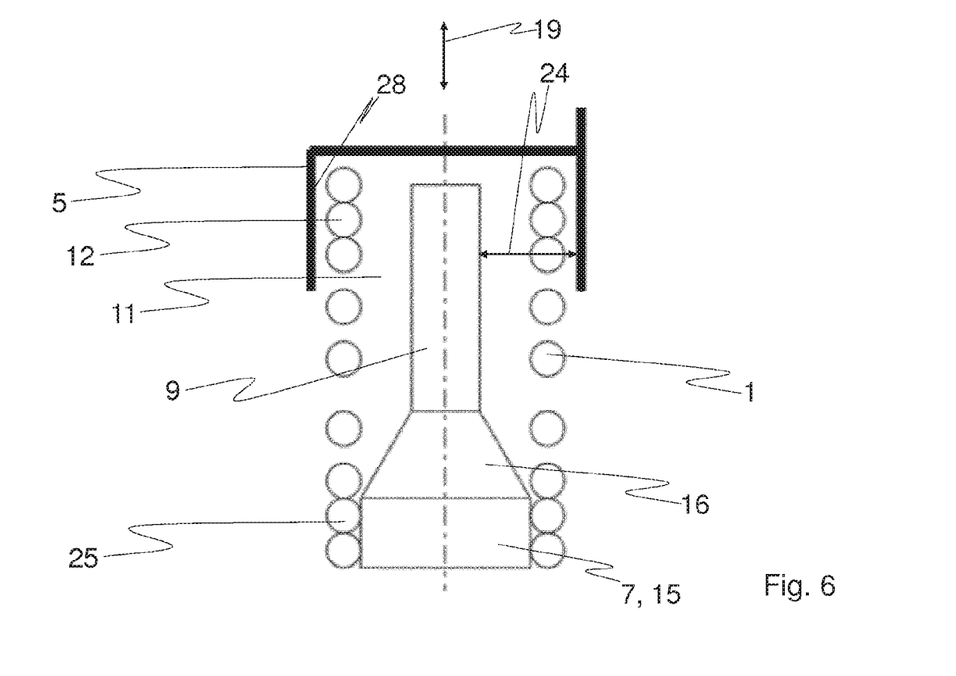

The embodiment of FIG. 6, finally, has a structure that is fundamentally analogous to the embodiment of FIG. 3, wherein the spring element 1 is connected with the two mounting elements 5, 7 with force fit. However, the spring element 1 is not pushed over the first mounting element 5 with its first end section 12, but rather pushed into the attachment section 28 of the first mounting element 5. In this regard, the first end section 12 of the spring element 1 is slightly compressed in the radial direction, in other words transversely to the axial direction 19, so that the spring element 1 is braced to the attachment section 28 with force fit, due to its inherent tension.

In the case of the embodiment of FIG. 6, the spring element 1 is therefore disposed in the gap 11 in certain sections. The gap width 24 must be correspondingly wide, so that on the one hand, the spring element 1 finds room, and on the other hand, sufficient space remains for displacements in the transverse direction, before the bolt-shaped section 9 makes contact with the spring element 1. In other words, the maximal displacement in the transverse direction is restricted by contacting of the bolt-shaped section 9 with the spring element 1.

Figure 7:
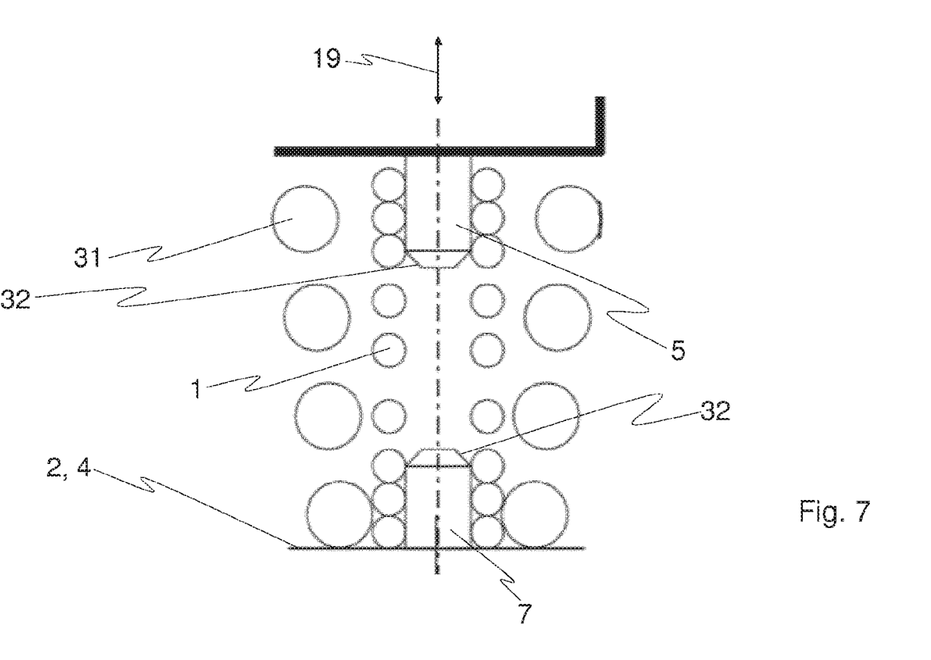

The representation in FIG. 7 relates to a further embodiment of the refrigerant compressor according to the invention. In this embodiment, the spring element 1 surrounds the two mounting elements 5, 7. The mounting elements 5, 7 are both structured essentially in bolt shape in the exemplary embodiment shown, wherein the free ends of the mounting elements 5, 7, viewed in the axial direction 19, have a chamfer 32. The spring element 1 is connected with the two mounting elements 5, 7 with force fit.

An outer spring element 31 is provided for absorbing transverse forces in the event of great displacements of the drive unit 6 in the transverse direction, which element surrounds the two mounting elements 5, 7 as well as the spring element 1, and has a different, preferably greater stiffness than the spring element 1. The outer spring element 31 is connected with the mounting region 2 of the housing 3 in that the outer spring element 31 lies against the spring element 1 with force fit in the region of the second mounting element 7. Furthermore, the outer spring element 31 is connected with the drive unit 6 in known manner.

The outer spring element 31 has windings that form a clear cross-section between them, so that the outer spring element 31 can surround the spring element 1 and thereby also the mounting elements 5, 7. In this regard, the clear cross-section stands normal to the axial direction 19. In the exemplary embodiment shown, the outer spring element 31 is furthermore designed in such a manner that the clear cross-section increases, viewed in the axial direction 19. In this way, the result is brought about that the outer spring element 31 responds, above all in the case of great displacements of the drive unit 6 in the transverse direction, and actively absorbs the major portion of the transverse forces that occur. The outer spring element 31 therefore brings about stress relief of the spring element 1, in targeted manner, in the case of great displacements of the drive unit 6 in the transverse direction. At the same time, the outer spring element 31 with its increased stiffness brings about a restriction of the maximal displacement of the drive unit 6 in the transverse direction. In the case of slight displacements of the drive unit 6 in the transverse direction, good damping of vibrations and therefore of disruptive noises is nevertheless achieved due to the lesser stiffness of the spring element 1.

REFERENCE SYMBOL LIST 1 spring element
2 mounting region
3 housing
4 housing bottom
5 first mounting element
6 drive unit
7 second mounting element
8 inner wall of the first mounting element
9 bolt-shaped section of the second mounting unit
10 overlap region
11 radial gap
12 first end section of the spring element
13 clamping sleeve
14 first end section of the second mounting element
15 second end section of the second mounting element
16 transition section of the second mounting element
17, 17', 17" first stop surface
18, 18', 18" second stop surface
19 axial direction
20 support element
21 crankcase
22 further spring element
23 screw
24 radial gap width
25 second end section of the spring element
26 first end section of the further spring element
27 second end section of the further spring element
28 attachment section of the first mounting element
29 further attachment section of the first mounting element
30 sleeve welded to the mounting region
31 outer spring element
32 chamfer

The invention claimed is:

1. A refrigerant compressor, comprising a hermetically sealed housing and a drive unit having a piston/cylinder unit for cyclical compression of a refrigerant and an electric motor for drive of the piston/cylinder unit; wherein the drive unit is disposed in the interior of the housing and is attached to at least one mounting region of the housing with mounting action, by at least one spring element;
wherein a first mounting element and a second mounting element are provided; wherein one of the two mounting elements is connected with the drive unit and the other one of the two mounting elements is connected with the at least one mounting region;
wherein the first mounting element and/or the second mounting element is/are surrounded by the at least one spring element;
wherein the first mounting element is configured in sleeve shape and has an inner wall, and wherein the second mounting element has a bolt-shaped section, wherein the bolt-shaped section is accommodated, at least in certain sections, in the first mounting element, thereby forming an overlap region,
wherein a gap is formed, between the bolt-shaped section of the second mounting element and the inner wall of the first mounting element, in the overlap region and
wherein the inner wall of the first mounting element and/or the bolt-shaped section is/are provided with a viscoelastic layer, in the certain sections of the first mounting element and wherein the viscoelastic layer does not fill the gap.

2. The refrigerant compressor according to claim 1, wherein the first mounting element is produced from a viscoelastic or flexible material.

3. The refrigerant compressor according to claim 1, wherein the first mounting element is connected with the at least one spring element with force fit in the certain sections of the first mounting element.

4. The refrigerant compressor according to claim 1, wherein a first end section of the at least one spring element is braced between the first mounting element and a clamping sleeve disposed on the first mounting element.

5. The refrigerant compressor according to claim 1, wherein the drive unit is attached to a housing bottom of the housing.

6. The refrigerant compressor according to claim 1, wherein the gap takes up between 20% and 60% of the diameter of the inner wall of the first mounting element.

7. The refrigerant compressor according to claim 6, wherein the gap takes up between 30% and 50% of the diameter of the inner wall of the first mounting element.

8. The refrigerant compressor according to claim 6, wherein the gap takes up between 35% and 45% of the diameter of the inner wall of the first mounting element.

9. The refrigerant compressor according to claim 1, wherein a first spring element of the at least one spring element between a second end section of the second mounting element and the first mounting element, wherein second spring element of the at least one spring element between a first end section of the second mounting element and the first mounting element, and wherein the bolt-shaped section is formed in a section that lies between the first end section and the second end section.

10. The refrigerant compressor according to claim 9, wherein the first mounting element has a projecting support element which support element is connected with the drive unit.

11. The refrigerant compressor according to claim 9, wherein the bolt-shaped section passes completely through the first mounting element in the axial direction.

12. The refrigerant compressor according to claim 1, wherein the bolt-shaped section is formed by a first end section of the second mounting element, wherein a second end section of the second mounting element has a greater diameter in comparison with the bolt-shaped section.

13. The refrigerant compressor according to claim 12, wherein the second end section of the second mounting element is connected with the at least one spring element with force fit.

14. The refrigerant compressor according to claim 12, wherein the second mounting element has a transition section that is disposed between the bolt-shaped section and the second end section, in which transition section the diameter increases uniformly in the transition section from a smallest value in the region of the bolt-shaped section to a greatest value in the region of the second end section of the second mounting element.

15. The refrigerant compressor according to claim 14, wherein the diameter in the transition section increases conically, from a smallest value in the region of the bolt-shaped section to a greatest value in the region of the second end section of the second mounting element.

16. The refrigerant compressor according to claim 12, wherein the first end section of the second mounting element is delimited in the axial direction by a first stop surface for contact with a second stop surface.

17. The refrigerant compressor according to claim 16, wherein the second stop surface is formed by the first mounting element or by the operating unit, wherein the first stop surface and the second stop surface are spaced apart from one another in an operating position.

18. The refrigerant compressor according to claim 16, wherein the first stop surface comprises a planar stop surface.

* * * * *